DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 30, 1973

915 O.G. 1569

T915,014
TUBULAR THERMOPLASTIC FILM TEMPERATURE CONTROL

Max Goldman, Latham, N.Y., assignor to E. I. du Pont de Nemours and Company, Wilmington, Del.

Continuation of abandoned application Ser. No. 197,217, Nov. 10, 1971. This application Dec. 22, 1972, Ser. No. 317,805

Int. Cl. B29c *17/02*
U.S. Cl. 264—95
1 Sheet Drawing. 6 Pages Specification

A process and apparatus for cooling thermoplastic film material (e.g., polypropylene or polyethylene film) which is downwardly extruded in the form of a tube, by passing air countercurrently to the direction of travel of the extruded tube, in two, segregated temperature control zones. The extruded tube is quenched, preheated to near its orientation temperature, heated and expanded to orient, and then quenched at the point of its maximum expansion. The improvement consists in passing countercurrent to the direction of tube movement a stream of air upward and adjacent to the tube within an enclosure that surrounds the tube. The air flow is from a point of maximum radical expansion of the tube and prior to quenching, to a point at which the tube is preheated and at its unexpanded diameter. The air is exhausted at a controlled rate at the upper end of the enclosure. A second stream of air is passed upwardly and adjacent to the tube within a second enclosure that surrounds the tube along that portion of the tube being preheated. This stream of air is also exhausted at a controlled rate at the upper end of the enclosure. The two streams of air both enter the enclosures at temperatures less than that of the tube at the point of entry.

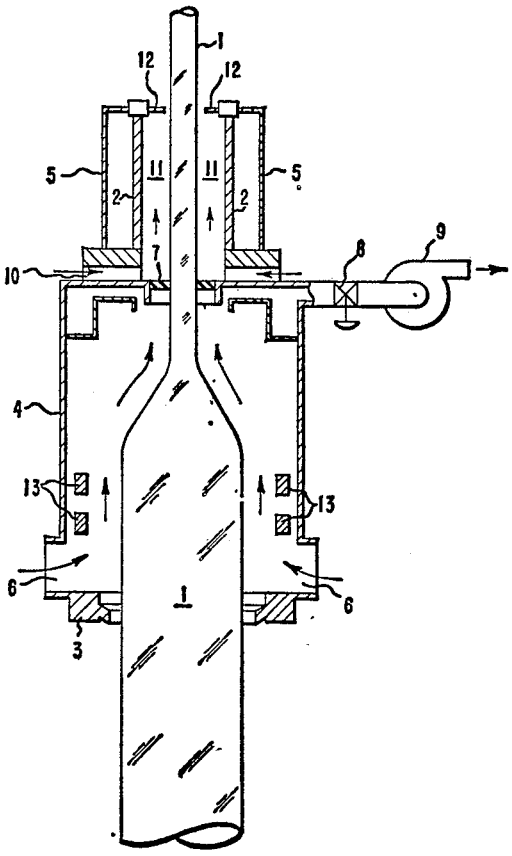

Oct. 30, 1973 M. GOLDMAN T915,014
TUBULAR THERMOPLASTIC FILM TEMPERATURE CONTROL
Filed Dec. 22, 1972
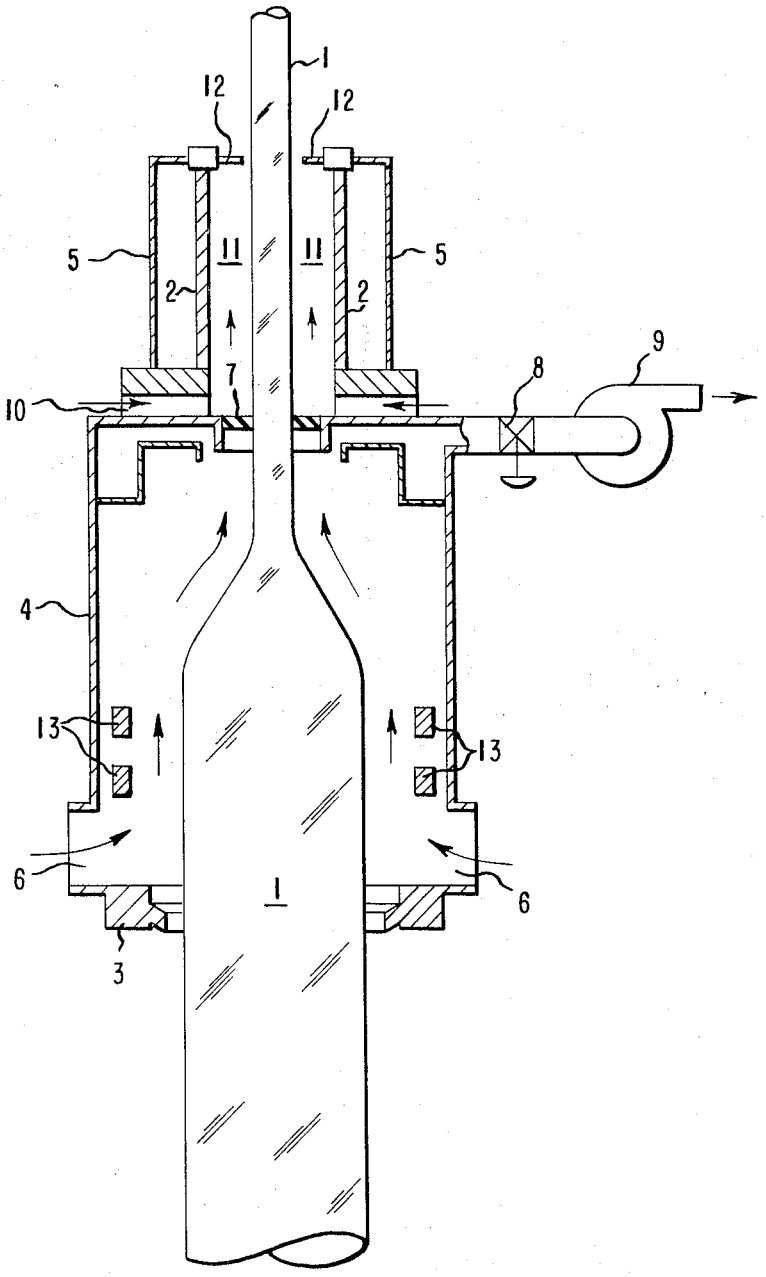
INVENTOR
MAX GOLDMAN
BY Donald W. Sutter
ATTORNEY